(12) United States Patent
Vandervelde et al.

(10) Patent No.: US 11,445,367 B2
(45) Date of Patent: Sep. 13, 2022

(54) APPARATUS AND METHOD FOR MANAGING SECURITY KEYS IN WIRELESS COMMUNICATION SYSTEM

(71) Applicant: Samsung Electronics Co., Ltd., Suwon-si (KR)

(72) Inventors: Himke Vandervelde, Staines Middlesex (GB); Rajavelsamy Rajadurai, Bangalore (IN); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/614,109

(22) PCT Filed: May 15, 2018

(86) PCT No.: PCT/KR2018/005525
§ 371 (c)(1),
(2) Date: Nov. 15, 2019

(87) PCT Pub. No.: WO2018/212539
PCT Pub. Date: Nov. 22, 2018

(65) Prior Publication Data
US 2021/0160692 A1    May 27, 2021

(30) Foreign Application Priority Data

May 15, 2017  (IN) .............................. 201731016943

(51) Int. Cl.
*H04L 9/08* (2006.01)
*H04W 12/0433* (2021.01)
(Continued)

(52) U.S. Cl.
CPC ....... *H04W 12/0433* (2021.01); *H04L 9/0891* (2013.01); *H04W 12/041* (2021.01); *H04W 76/15* (2018.02)

(58) Field of Classification Search
CPC ............ H04W 12/0433; H04W 76/15; H04W 12/041; H04L 9/0891
See application file for complete search history.

(56) References Cited

U.S. PATENT DOCUMENTS 10,624,005 B2 *  4/2020  Liu .................... H04W 12/033
2015/0208235 A1   7/2015  Ingale et al.
(Continued)

FOREIGN PATENT DOCUMENTS

CN    103959829 A    7/2014
CN    104918242 A    9/2015
(Continued)

OTHER PUBLICATIONS

Huawei, HiSilicon, Counter Check in LTE-NR Interworking Discussion and Decision, p. 1-3, publicly available date is the uploaded date of May 6, 2017 (Year: 2017).*

(Continued)

*Primary Examiner* — Mohammad A Siddiqi
(74) *Attorney, Agent, or Firm* — Jefferson IP Law, LLP (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Disclosed is method of refreshing a security key in a secondary cell group (SCG) controlled by a secondary node (SN) of a wireless communication system, wherein the network is configured to operate in dual connectivity (DC) mode and further comprises a master cell group (MCG) controlled by a master node (MN) the method comprising: the SN indi-
(Continued)

cating in a first message to a user equipment (UE) that security key refresh is to be performed; the UE generating the refreshed security key and transmitting a second message to the SN, wherein the second message indicates that the security key has been refreshed.

16 Claims, 3 Drawing Sheets

(51) Int. Cl.
*H04W 12/041* (2021.01)
*H04W 76/15* (2018.01)

(56) References Cited

U.S. PATENT DOCUMENTS

| | | | |
|---|---|---|---|
| 2016/0044639 | A1 | 2/2016 | Yi et al. |
| 2016/0366175 | A1* | 12/2016 | Basu Mallick ....... H04W 76/15 |
| 2020/0288362 | A1* | 9/2020 | Saily ................. H04W 74/0833 |

FOREIGN PATENT DOCUMENTS

| | | | | |
|---|---|---|---|---|
| CN | 108633018 | A * | 10/2018 | ............ H04W 80/02 |
| CN | 109196897 | A | 1/2019 | |
| EP | 3 057 349 | A1 | 8/2016 | |
| KR | 10-2015-0103201 | A | 9/2015 | |
| WO | 2017173561 | A1 | 10/2017 | |

OTHER PUBLICATIONS

3GPP TSG RAN WG1 #89 Samsung. Dual Connectivity Aspect in NR. R1-1708042. Hangzhou, China, May 15-19, 2017. pp. 1-2.
3GPP TSG-RAN WG2 #98 Ericsson. Key Refresh in NR TdocR2-1704171. (Revision of R2-1702555) Hangzhou, P.R. of China, May 15-19, 2017.
3GPP TSG-RAN WG3 Meeting #96 Change Request CR CRNum rev-Current Version: 0.0.2. R3-171469. Hangzhou, P.R. China, May 15-17, 2017.
Examination Report under Section 18(3) of Intellectual Property Office dated Oct. 25, 2019 Application No. GB1807843.6. Your Reference No. P34239GB1/RED.
Combined Search and Examination Report under Section 17 and 18(3) of Intellectual Property Office dated Nov. 6, 2018. Application No. GB1807843.6. Your Reference No. P34239GB1.
3GPP TSG-RAN WG2 Meeting #98 Huawei, HiSilicon. Counter check in LTE-NR interworking. Hangzhou, China, May 15-19, 2017. R2-105151.
3GPP TS 36.300 V15.7.0 (Sep. 2019). 3rd Generation Partnership Project; Technical Specification Group Radio Access Network; Evolved Universal Terrestrial Radio Access (E-ULTRA) and Evolved Universal Terrestrial Radio Access Network (E-UTRAN); Overall description; Stage 2 (Release 15).
Korean Office Action dated Dec. 7, 2021, issued in Korean Patent Application No. 10-2019-7036993.
Korean Notice of Patent Grant dated Jun. 15, 2022, issued in Korean Patent Application No. 10-2019-7036993.
Huawei et al., Counter check in LTE-NR interworking, R2-105151, 3GPP TSG-RAN WG2 Meeting #98, Hangzhou, China, May 15-19, 2017.
Indian Office Action dated Feb. 25, 2022, issued in Indian Patent Application No. 201927051877.
Chinese Office Action dated May 6, 2022, issued in Chinese Patent Application No. 201880032444.X.

* cited by examiner

APPARATUS AND METHOD FOR MANAGING SECURITY KEYS IN WIRELESS COMMUNICATION SYSTEM

TECHNICAL FIELD

The present disclosure relates to security keys in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

An aspect of the present disclosure to provide an apparatus and a method for effectively managing security keys in a wireless communication system.

Solution to Problem

According to the present disclosure there is provided an apparatus and method as set forth in the statements of invention which follow. Other features of the invention will be apparent from the description which follows.

According to the present disclosure, there is provided a method of refreshing a security key in a secondary cell group (SCG) controlled by a secondary node (SN) of a wireless communication system, wherein the wireless communication system is configured to operate in dual connectivity (DC) mode and further comprises a master cell group (MCG) controlled by a master node (MN) the method comprising the steps of: the SN indicating in a first message to a user equipment (UE) that security key refresh is to be performed; the UE generating the refreshed security key and transmitting a second message to the SN, wherein the second message indicates that the security key has been refreshed.

In an embodiment, the first message includes a counter value to be used in generating the refreshed security key.

In an embodiment, the presence of the counter in the first message indicates that the security key is to be refreshed.

In an embodiment, at initialisation, the MN provides an initial security key.

In an embodiment, the counter value is different to a counter used by the MN.

In an embodiment, the MN provides the SN with a plurality of security keys in advance. This allows the MN to avoid being involved in the SCG security key refresh in real-time.

In an embodiment, the step of the UE generating the refreshed security key comprises deriving the refreshed key from a current security key.

In an embodiment, the first and second message are transparently forwarded by the MN.

In an embodiment, wherein the first and second messages are transferred via SCG Signaling Radio Bearers.

In an embodiment, the Dual Connectivity is NR-NR mode.

According to another aspect of the present disclosure, there is provided a wireless communication system comprising an MN, an SN and a UE, arranged, respectively, to perform the method of the first aspect.

Advantageously, there is provided a single step procedure to refresh SCG security. The single step does not require the direct involvement of the MN, but it may be involved in passing messages between the SN and the UE.

Advantageously, a new SCG key is derived by the SN based on a current SCG key and a counter value. The UE may perform a similar action. For this, the SN operates its own counter and is operable to provide this to the UE by itself.

Although a few preferred embodiments of the present disclosure have been shown and described, it will be appreciated by those skilled in the art that various changes and modifications might be made without departing from the scope of the invention, as defined in the statements of invention.

BRIEF DESCRIPTION OF DRAWINGS

For a better understanding of the invention, and to show how embodiments of the same may be carried into effect, reference will now be made, by way of example only, to the accompanying diagrammatic drawings in which.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for managing security keys in a wireless communication system. In particular, the present disclosure relates to a dual connectivity (DC) configuration involving a first radio access technology (RAT) (e.g., Long Term Evolution (LTE)) and/or a second RAT (e.g., new radio (NR)), but can also apply in other configurations. In DC configurations, there is a master node (MN) and at least one secondary node (SN).

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
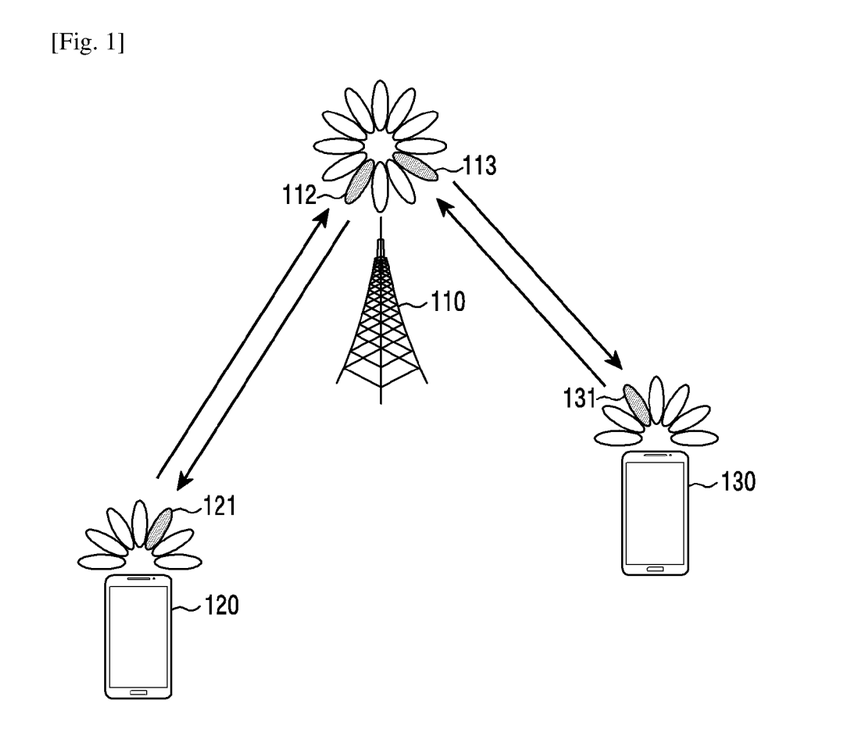
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5$^{th}$ generation (5G) node," "wireless point," "transmission/reception Point (TRP)" as well as "base station." In a DC operations, the BS 110 may be operated as a MN or a SN.

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
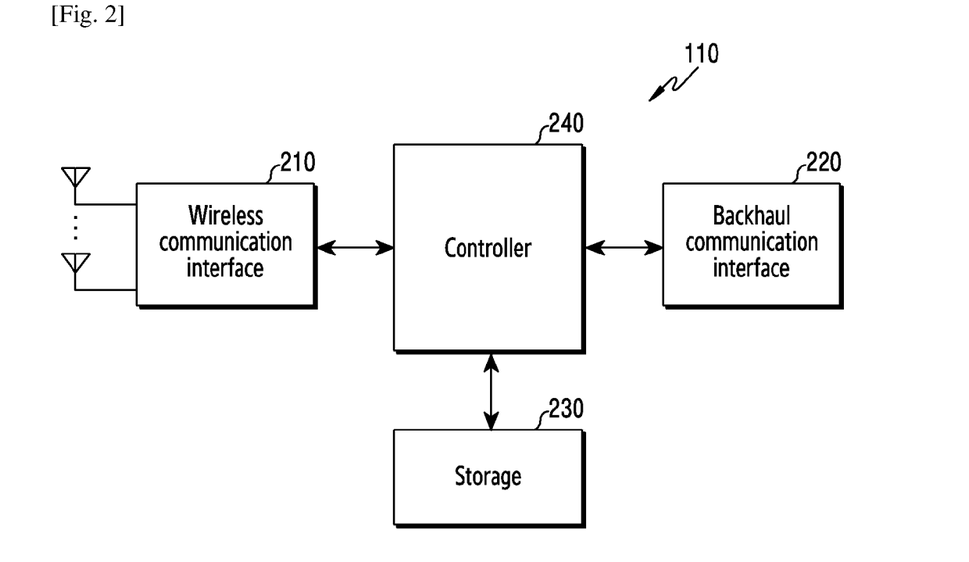
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may control the base station to perform operations according to the exemplary embodiments of the present disclosure.

Figure 3:
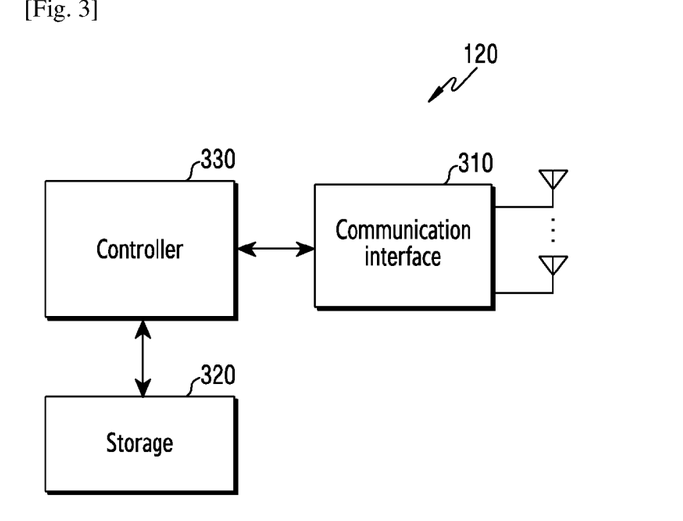
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may control the terminal to perform operations according to the exemplary embodiments of the present disclosure.

In situations where a refresh or an update of security keys is required, some problems can occur. Such problems are described in the following.

Consider a DC configuration: There is a UE configured with serving cells comprising:

Cells controlled by master node (e.g., MeNB in case of LTE) and

The set of serving cells controlled by MeNB is called master cell group (MCG)

Cells controlled by secondary node (e.g., SeNB in case of LTE)

The set of serving cells controlled by SeNB is called secondary cell group (SCG)

The UE is also configured with data radio bearers (DRBs). The DRB type indicates which cell group is used to transfer the data:

MCG DRB: carried by the MCG only (traffic routed to/packet data convergence protocol (PDCP) located in MN)

MCG split DRB: carried by the MCG and the SCG (traffic routed to/PDCP located in MN)

SCG DRB: carried by the SCG only (i.e., traffic routed to/PDCP located in SN)

In other words, in LTE, at least part of the traffic is carried by the SCG when at least one MCG split or SCG DRB is used.

The UE is further configured with certain security features:

Security is performed by a PDCP sub-layer

S-KeNB is used for a SCG security i.e. for a SCG DRB, where S-KeNB is a security key.

Note that the DC is also used in a NR (i.e. 5G systems) and has variants:

EUTRAN-NR (EN) DC (i.e. MN is using LTE and SN is using NR (i.e. a mix of LTE and 5G));

NR-EUTRAN (NE) DC (i.e. the other way around, where MN is using NR and SN is using LTE); and NR DC (i.e. MN and SN is using NR).

In the case of the NR, the nodes are referred to as MgNB/SgNB, rather than MeNB/SeNB as in the LTE. In the following, "master node" or MN will be used generically to refer to MeNB or MgNB, and "secondary node" (SN) will be used generically to refer to SeNB or SgNB. Similarly, a standards-specific terminology such as KeNB, should be considered to be exemplary only and is referred to only to exemplify the present disclosure.

In the examples which follow, the EN DC variant (i.e. a mix of LTE and G) is illustrated, but this is exemplary only and the skilled person will realise that other variants may equally benefit from embodiments of the present disclosure. In particular, NR DC, where both MN and SN use NR (5$^{th}$ Generation) technology is a particular embodiment of the present disclosure.

Figure 4:
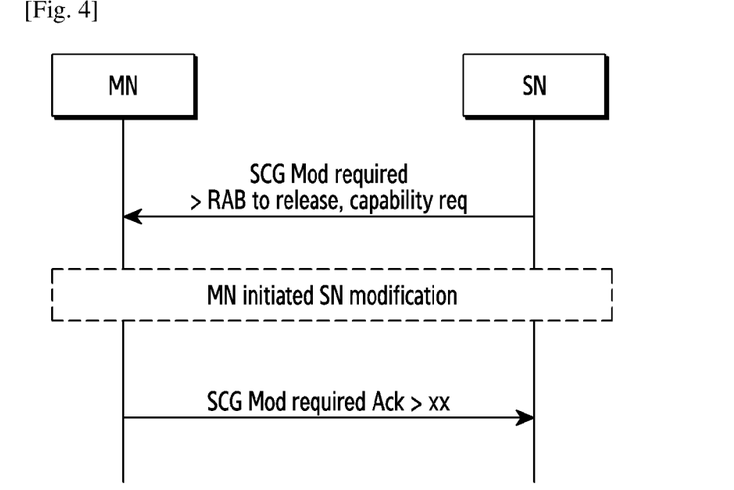
FIG. 4 illustrates a message exchange relating to secondary key update.

FIG. 4 illustrates a message exchange where there is a need to refresh a SCG security. The SN initiates a modification of the SCG towards MN (referred to as SeNB modification). In response, the MeNB generates S-KeNB and provides this to SeNB. The S-KeNB (the SCG security key used by SeNB) is generated by the MeNB based on KeNB (MCG security key) and scg-Counter, and the MN also provides scg-Counter to UE. Due to MN involvement in this process, the SeNB needs to interact with MeNB when it needs to refresh security.

This results in a procedure with an MN initiated procedure nested within an SN initiated procedure. The resultant procedure is complex and puts restrictions on the reconfigurations that the SN can initiate together with security refresh. This is generally undesirable.

In a little more detail:

The SeNB initiates the SeNB modification required, including a SCG change request (indication that SCG security should be refreshed)

There are some limitations regarding the contents of this message (e.g. it cannot include other SCG reconfigurations as the SN generates another SCG configuration later in the procedure, and only that one is actually used by UE)

The MeNB triggers the MeNB initiated the SeNB modification, nested within the SeNB initiated procedure Of this nested procedure, the initial message from the MeNB (a SeNB request) includes the new S-KeNB The response from the SeNB includes an actual modified SCG configuration as is forwarded to the UE Since a security refresh is a standardised issue, requiring agreement amongst many parties, discussions have taken place regarding updating this procedure. In particular, the discussions are ongoing concerning the handling of DRBs upon change of a PDCP location i.e. for the following cases Mobility (i.e., change of MeNB and/or SeNB)

Change of a DRB type involving re-location of PDCP (e.g., form MCG (split) to SCG (split) DRB)

In LTE DC, in order to simplify matters, there is one procedure including synchronous reconfiguration, layer-2 (L2) flush and security refresh, i.e., these elements are always performed together In fact, there two variants of this procedure:

Handover: for both MCG and SCG

SCG change: for SCG only

The SN initiates this procedure also if only a synchronous operation or a L2 flush is required e.g., DRB type change.

There is currently no firm agreement regarding whether, in NR, something similar to the procedure in LTE will be adopted. For instance:

When one DRB PDCP is relocated from SCG to MCG, SCG security key could be refreshed while PDCP is re-established for all DRBs with PDCP location in SN When one DRB PDCP is relocated from MCG to SCG, MCG and SCG security could be refreshed while PDCP is e-established for all DRBs that are configured Bearing in mind the problems and issues discussed above, embodiments of the present disclosure aim to address such problem and issues. In particular, embodiments of the present disclosure aim to streamline the procedure and make is as generally applicable across different technology platforms as possible.

Figure 5:
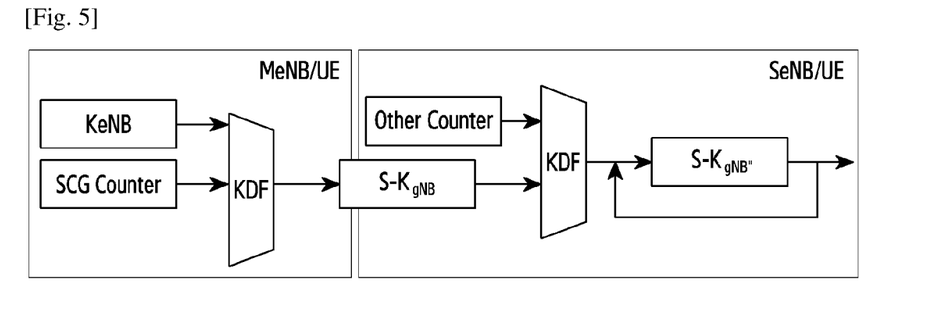
FIG. 5 illustrates a schematic representation in the wireless communication system according to various embodiments of the present disclosure.

FIG. 5 illustrates schematic representation in the wireless communication system according to various embodiments of the present disclosure. It illustrates the interface between the MeNB/UE and SgNB/UE in the particular context of a security refresh.

The MN still provides S-KgNB in some cases, i.e., the initial S-KgNB:

Upon initial DC configuration (SN establishment/addition)

Upon MCG security refresh, i.e., when MN refreshes KeNB (or KgNB), e.g., HO

SCG key (S-KgNB) is generated from the KeNB (or KgNB) and counter, as in LTE DC, known in the prior art.

The SN can refresh a SCG security/S-KgNB by itself, i.e., without MN involvement, to derive refreshed/subsequent S-KgNB (S-KeNB"). SCG key is generated from the old S-KeNB (or old S-KgNB) and counter. A separate counter is used, which is either controlled by the SN or provided by the SN to the UE. The refreshed SN key (S-KeNB") is used subsequently.

As an alternative, the MN may pre-provision the SN with a number of S-KgNBs to be used as required.

It should be noted that S-KgNB is used to derive further keys used for ciphering and integrity protection.

The configuration illustrated in FIG. 5 is applicable in case of NR DC as well as EN DC, as this could also be introduced into LTE DC, whenever SCG security is used (with separate SN/SCG key)

Figure 6:
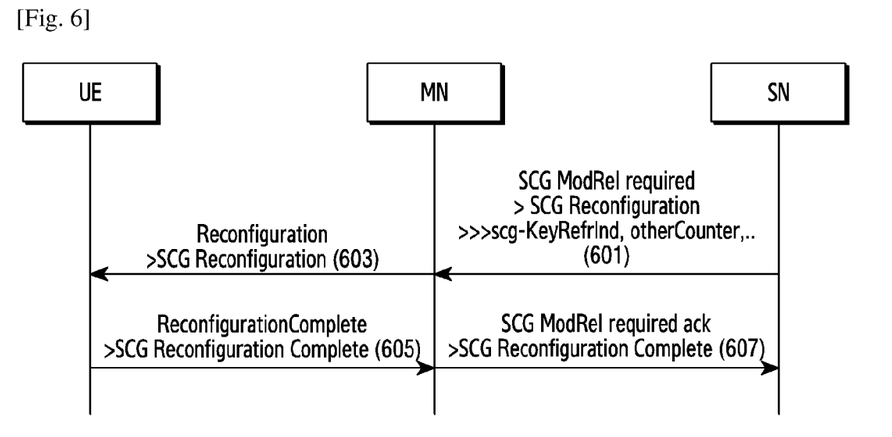
FIG. 6 illustrates a message exchange in the wireless communication system according to various embodiments of the present disclosure.
Figure 7:
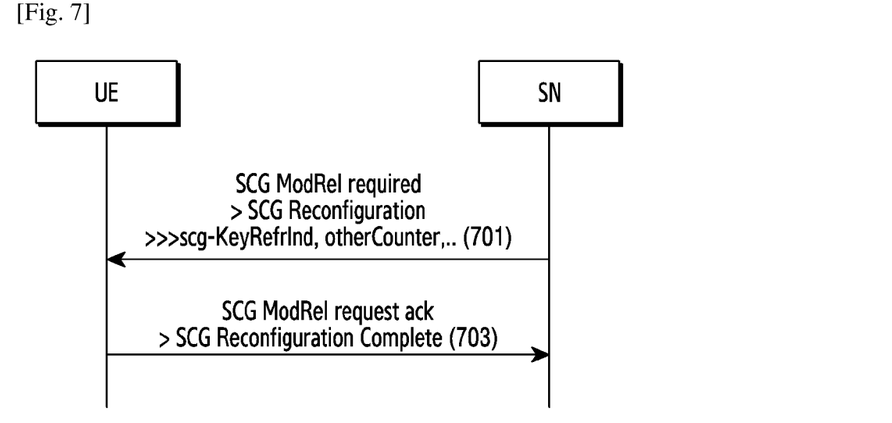
FIG. 7 illustrates a message exchange in the wireless communication system according to various embodiments of the present disclosure.

FIGS. 6 and 7 illustrate alternative but related message exchanges relating to embodiments of the present disclosure.

FIG. 6 illustrates a message exchange in the wireless communication system according to various embodiments of the present disclosure. FIG. 6 exemplifies an SN initiated refresh of SCG/SN key. Referring FIG. 6, in step 601, within SCG configuration, the SN indicates that key refresh is to be performed as well as the counter value to be used in the derivation of the refreshed key. It should be noted that the presence of the counter in the message may be used to indicate that key refresh is to be performed.

In step 603, the MN forwards the SCG configuration to the UE. This may include MCG configuration in the same message to UE. In step 605, the UE generates the new key, configures lower layers to apply this for ciphering and integrity protection and returns the complete message to the MN. In step 607, the MN forwards the SCG configuration complete message to the SN.

FIG. 7 illustrates a message exchange in the wireless communication system according to various embodiments of the present disclosure. FIG. 7 exemplifies a variation to this procedure, which may be performed using SCG signaling radio bearers (SRB) i.e. without MN involvement. It should be noted that in this embodiment, the SCG configuration signaling is same as shown in FIG. 6.

Referring FIG. 7, in step 701, the SN indicates that key refresh is to be performed as well as the counter value to be used in the derivation of the refreshed key. In step 703, the UE and returns the complete message to the SN.

Figure 8:
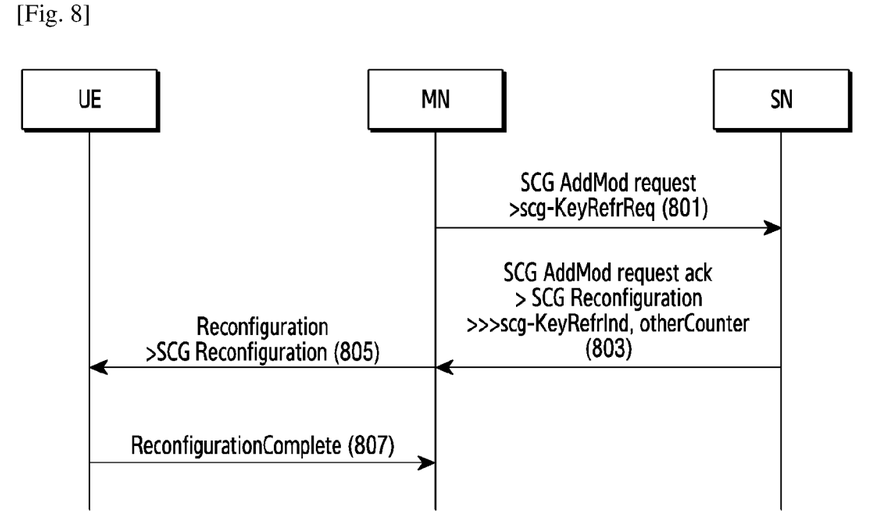
FIG. 8 illustrates a message exchange in the wireless communication system according to various embodiments of the present disclosure.

FIG. 8 illustrates a message exchange in the wireless communication system according to various embodiments of the present disclosure. FIG. 8 exemplifies a further message exchange according to an embodiment of the present disclosure. Referring FIG. 8, in step 801, the MN transmits a SCG addMod request message to the SN. In step 803, the SN transmits SCG addMod request acknowledge (ACK) to the MN. Then, in step 805, the MN transmits a reconfiguration message to the UE. Next, in step 807, the UE transmits a reconfiguration complete message to the MN.

In an embodiment shown in FIG. 8, the MN may request the SN to refresh SCG security. This may be done with or without a refresh of the MCG security.

In the prior art, there are two options:

A) The MN initiates SCG modification, requesting the SN to update security while providing a new S-KgNB generated by the MN; or B) The MN releases the SCG and subsequently adds the same SCG, upon which MN provides a new S-KgNB generated by MN In an embodiment of the present disclosure, as shown in FIG. 8, the SN controls key generation. Specifically, the MN requests the SN to refresh SCG security, using the SN controlled security approach (i.e. new S-KgNB is derived from S-KgNB and the SN generated count)

The SN input to the UE for derivation of a new key may be provided within the response to the MN, which initiates SCG modification.

According to embodiments of the present disclosure, certain features and/or advantages are present including the following.

The Use of a one step procedure to refresh SCG security, whereby a new SCG key is derived by the SN based on the current SCG key and an SN controlled/generated counter. The UE performs a similar action. In this instance, there is no involvement of, or input from, the MN, although—as shown in e.g. FIG. 6—messages may be exchanged via the MN, without the MN having any substantive contribution to the process.

The SN operates its own counter and provides this to the UE by itself. This counter may use values different from the ones used by MN when deriving SCG keys, as mentioned below. The MN may still provide initial SCG key (at initial SCG configuration as well as upon MCG key refresh). This supports the option that SCG is always derived from latest MCG key.

Embodiments of the present disclosure may be used in a variety of network configurations, including:

All cases of dual connectivity (DC) or multi connectivity (MC, such as:
The LTE DC
NR DC
LTE+NR DC (MN may be LTE or NR)
Similar options for multi-connectivity (i.e. multiple SN)

Embodiments of the present disclosure provide advantages over the prior art systems described earlier. These advantages include that when SCG security is refreshed:

there is no impact on bearers with PDCP located in MN it is possible to avoid a 2 step procedure, meaning that there is no additional delay associated with the $2^{nd}$ step and there are no more limitations regarding which reconfigurations can be done at the same time it may be possible to use direct/SCG SRB in some circumstances the procedure is relatively straightforward in that it builds on existing conventions/protocols.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a secondary node (SN) controlling a secondary cell group (SCG) in a wireless communication system, wherein the wireless communication system is configured to operate in dual connectivity (DC) mode and further comprises a master cell group (MCG) controlled by a master node (MN), the method comprising:
   transmitting, to a user equipment (UE), a first message informing that a security key refresh is to be performed; and
   receiving, from the UE, a second message indicating that a security key for the SN has been refreshed,
   wherein the security key for the SN is generated based on a counter value of the SN and a security key for the MN,
   wherein, at initialization, the MN provides an initial security key, and
   wherein the refreshed security key is generated by deriving the refreshed security key from a current security key.

2. The method of claim 1, wherein the first message comprises the counter value of the SN to be used in generating the refreshed security key.

3. The method of claim 1, wherein the counter value of the SN is different to a counter value of the MN.

4. The method of claim 1, wherein the MN provides the SN with a plurality of security keys in advance.

5. The method of claim 1, wherein the first message and second message are transparently forwarded by the MN.

6. The method of claim 1, wherein the first message and second messages are transferred via SCG Signaling Radio Bearers.

7. The method of claim 1, wherein the DC is new radio (NR)-NR mode.

8. A method performed by a user equipment (UE) in a wireless communication system, wherein the wireless communication system is configured to operate in dual connectivity (DC) mode and further comprises a master cell group (MCG) controlled by a master node (MN) and a secondary cell group (SCG) controlled by a secondary node (SN), the method comprising:
   receiving, from the SN, a first message informing that a security key refresh is to be performed; and
   transmitting, to the SN, a second message indicating that a security key has been refreshed,
   wherein the security key for the SN is generated based on a counter value of the SN and a security key for the MN,
   wherein, at initialization, the MN provides an initial security key, and
   wherein the refreshed security key is generated by deriving the refreshed security key from a current security key.

9. The method of claim 8, wherein a presence of the counter value of the SN in the first message indicates that the security key is to be refreshed.

10. The method of claim 8, wherein the first message comprises the counter value of the SN to be used in generating the refreshed security key.

11. The method of claim 8, wherein the counter value of the SN is different to a counter value of the MN.

12. The method of claim 8, wherein the MN provides the SN with a plurality of security keys in advance.

13. The method of claim 8, wherein the first message and second message are transparently forwarded by the MN.

14. The method of claim 8, wherein the DC is new radio (NR)-NR mode.

15. A secondary node (SN) controlling a secondary cell group (SCG) in a wireless communication system, wherein the wireless communication system is configured to operate in dual connectivity (DC) mode and further comprises a master cell group (MCG) controlled by a master node (MN), the secondary node comprising:
   a transceiver; and
   at least one processor operably coupled to the transceiver, wherein the at least one processor is configured to:
      transmit, to a user equipment (UE), a first message informing that a security key refresh is to be performed, and
      receive, from the UE, a second message indicating that a security key has been refreshed, and
   wherein the security key for the SN is generated based on a counter value of the SN and a security key for the MN,
   wherein, at initialization, the MN provides an initial security key, and
   wherein the refreshed security key is generated by deriving the refreshed security key from a current security key.

16. The secondary node of claim 15, wherein the first message comprises the counter value of the SN to be used in generating the refreshed security key.

* * * * *